United States Patent
Kim

(10) Patent No.: US 7,597,408 B2
(45) Date of Patent: Oct. 6, 2009

(54) METHOD FOR COMPENSATING REGENERATIVE BRAKING AMOUNT WHEN REGENERATIVE BRAKING OF VEHICLE FAILS

(75) Inventor: Chang Hyun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 252 days.

(21) Appl. No.: 11/648,737

(22) Filed: Dec. 29, 2006

(65) Prior Publication Data

US 2008/0116744 A1    May 22, 2008

(30) Foreign Application Priority Data

Nov. 20, 2006 (KR) ...................... 10-2006-0114787

(51) Int. Cl.
*B60T 8/64* (2006.01)
(52) U.S. Cl. .................................. 303/122.03; 303/152
(58) Field of Classification Search ...............................
303/122.03–122.09, 152; 180/65.2, 65.3, 180/65.8
See application file for complete search history.

(56) References Cited

U.S. PATENT DOCUMENTS 6,086,166 A    7/2000    Fukasawa

FOREIGN PATENT DOCUMENTS

| JP | 09-149209 | 6/1997 |
| JP | 11-004503 | 1/1999 |
| JP | 2000-156901 | 6/2000 |
| KR | 2002-0091799 | 12/2002 |

*Primary Examiner*—Christopher P Schwartz
(74) *Attorney, Agent, or Firm*—Morgan, Lewis & Bockius LLP

(57) ABSTRACT

A method for compensating a regenerative braking amount when regenerative braking of a vehicle fails due to an error in controller area network (CAN) communications between an electronic brake system (EBS) and a hybrid control unit (HCU). The method includes steps of determining whether or not the regenerative braking is activated, remembering a regenerative braking control amount in the HCU and the EBS, learning and remembering a difference between the regenerative braking control amount in a normal state calculated just before the failure and the braking amount for the failure check in the HCU and the EBS, compensating the braking amount for the failure check with the difference value between the normal regenerative braking control amount and the braking amount for the failure check, and performing a regenerative braking control in the HCU and the EBS respectively.

3 Claims, 5 Drawing Sheets

METHOD FOR COMPENSATING REGENERATIVE BRAKING AMOUNT WHEN REGENERATIVE BRAKING OF VEHICLE FAILS

CROSS-REFERENCE TO RELATED APPLICATION

This application claims the benefit of Korean Patent Application No. 10-2006-0114787, filed on Nov. 20, 2006, the entire disclosure of which is hereby incorporated by reference.

BACKGROUND OF THE INVENTION

1. Field of the Invention

The present invention relates to a method for compensating a regenerative braking amount when a regenerative braking of a vehicle fails and, more particularly, to such a compensating method when regenerative braking fails due to an error in controller area network (CAN) communications between an electronic brake system (EBS) and a hybrid control unit (HCU 2. Description of Related Art In general, an electric vehicle means a vehicle that drives a motor using electric energy stored in a battery and uses the driving force of the motor as a power source wholly or partially.

At present, the electric vehicle is classified into a pure electric vehicle that applies only the electric energy of the battery as the power source and a hybrid electric vehicle that includes an internal combustion engine to apply the power generated from the engine to the battery charge and/or to the driving of the vehicle.

In the specification of the present invention, the term of the electric vehicle denotes the pure electric vehicle distinguished from the hybrid electric vehicle in a narrow sense and the electric vehicle in a broad sense includes the pure electric vehicle and the hybrid electric vehicle and, further, it is used to denote any vehicle in which at least one battery is established and the electric energy stored in the battery is used as a driving force of the vehicle.

That is, in a vehicle driven by a main or auxiliary driving power of the electric motor, the general electric vehicle and the hybrid electric vehicle are called the electric vehicle, and the driving motor plays a role of driving the vehicle and, at the same time, performs the regenerative braking in reducing the vehicle driving speed as well, thus collecting the kinetic energy and storing the same.

In general, the electric vehicle in braking applies a portion of braking force to the generation of electric power and uses the generated electric energy in charging the battery. Here, a portion of the kinetic energy is used as energy required for driving an electric generator, thus realizing the reduction of the kinetic energy (i.e., the reduction of the driving speed) and the generation of electric energy at that same time.

The braking method as described above is called the regenerative braking.

The generation of the electric energy in the regenerative braking mode is achieved by a separate electric generator or by driving the motor reversely.

By the regenerative braking control in braking the electric vehicle, the available driving distance of the electric vehicle is increased and, in case of the hybrid electric vehicle, the fuel efficiency is improved and the generation of noxious exhaust gas is reduced as well.

Meanwhile, a hydraulic brake system that causes a braking force by the hydraulic pressure may be equipped in the electric vehicle; however, such a hydraulic brake system may not attain a sufficient braking force only with the regenerative braking force, since a desirable vehicle dynamics control cannot be obtained only with the braking force of the driving wheels as the regenerative braking force is generated in the driving wheels connected to the motor.

In a normal state, the braking force (the operation of the brake pedal) that the driver wants is made by the sum total of the hydraulic braking force and the regenerative braking force. Accordingly, if a desired braking force is not obtained due to the limitations in the motor, battery, etc., the hydraulic braking force that generates thermal energy by the frictional force of a disc and a pad is applied as much as its difference, and the regenerative braking force operates the electric generator when reducing the speed of the driving motor dedicated to the drive to generate the necessary braking force and, at the same time, the electric power generated at this time is stored in the battery.

In general, the motor of the electric vehicle acts as an electric generator to produce the necessary braking forces of the whole vehicle. If the braking force control is not achieved by the motor connected with the general brake such as the existing hydraulic brake, etc., the driver cannot obtain a desired braking feel as he or she additionally feels a speed reduction as much as the braking force by the regenerative braking, and further the driver may always feel that the vehicle is suddenly stopped during the electric power generation by the motor.

To prevent such a problem, it is necessary to provide a braking force cooperative control between a regenerative braking torque controller taking charge of the regenerative braking of the motor a the hydraulic braking torque controller of the brake system.

However, if there occurs an error in data communications between the regenerative braking torque controller and the hydraulic braking torque controller that performs the frictional braking in the normal state and thereby the cooperative control fails (error, shortage, etc.), the hydraulic braking torque is sharply increased and, at the same time, the regenerative braking torque is suddenly lowered to a zero level, thus decreasing the braking force or the braking feel remarkably.

Paying regard to the above circumstances, a braking torque control system having a regenerative braking torque generator and a frictional braking torque generator has been disclosed in U.S. Pat. No. 6,086,166. Such a control system controls the total braking torque when there is a failure in exchanging data between the regenerative braking torque generator and the hydraulic braking torque generator; however, it controls to reduce the target regenerative braking torque.

That is, in U.S. Pat. No. 6,086,166, there has been disclosed a method of decreasing the regenerative braking torque generated in a motor gradually to an end time of braking and increasing the hydraulic braking torque gradually to the end time of braking when there occurs a failure (error, shortage, etc.) in the data CAN communications between the regenerative braking torque generator and the hydraulic braking torque generator, thus preventing the braking force from being reduced and the braking feel from being changed.

However, the above-described method and system have drawbacks in that the energy recovery rate by the electric power generation of the motor is lowered as the regenerative braking torque is decreased when the CAN communication fails and, in effect, it is impossible to perform a hydraulic control for accurately matching the increment or the decrement of the regenerative braking torque and the hydraulic braking torque with each other, thus causing changes in the braking feel due to fluctuations in the regenerative braking torque and the hydraulic braking torque.

Meanwhile, as another conventional technique related to the regenerative braking, Japanese Patent Publication No. 1999-004503 has disclosed a structure in which a regenerative braking torque is reduced when an abnormality occurs in information interchanges between a regenerative braking device and a hydraulic braking device.

Moreover, Korean Patent Publication No. 2002-0091799 has disclosed a braking force control apparatus in which a target regenerative braking force is gradually reduced and a target frictional braking force is gradually increased, if it is quite likely that an anti-skid control will be started afterwards, whereas, the target regenerative braking forces are set as 0, if the anti-skid control is started.

Furthermore, Japanese Patent Publication No. 1995-149209 has disclosed a regenerative braking system in which, when an abnormality in a regenerative braking system takes place, a clutch connecting the regenerative braking system with a driving system is controlled to issue an alarm of the abnormality of the regenerative braking system.

In addition, Japanese Patent Publication No. 2000-156901 has disclosed a structure of controlling a brake and a motor by periodically calculating an available regenerative braking amount in accordance with a remaining capacity of a battery and a driving state of the motor so as to set a regenerative torque of the motor from a brake torque and the available regenerative braking amount during the brake operation.

However, the above-described conventional arts have drawbacks in that the regenerative braking amount is always reduced and thereby the charging amount of the battery is restricted when the CAN communication fails or there occurs a failure in that the regenerative control is not available.

SUMMARY OF THE INVENTION

Embodiments of the present invention provide a method for compensating a regenerative braking amount when a regenerative braking of a vehicle fails due to an error in controller area network (CAN) communications between an electronic brake system (EBS) and a hybrid control unit (HCU). According to the present invention, when there occurs a failure related to the regenerative braking system, it is possible to compensate the difference between the regenerative braking control amount in a normal state calculated just before the failure and the braking amount in the failure to increase or decrease the regenerative braking amount in accordance with the vehicle state, thus ensuring the battery charging strategy and improving the fuel efficiency.

In an exemplary embodiment of the present invention, there is provided a method for compensating a regenerative braking amount when a regenerative braking of a vehicle fails, the method comprising the steps of: determining where or not the regenerative braking is activated; remembering a regenerative braking control amount in a hybrid control unit (hereinafter referred to as the HCU) and an electronic brake system (hereinafter referred to as the EBS), if determined that the regenerative braking is activated in the previous step; calculating a braking amount for failure check in the HCU and the EBS when there occurs a failure related to the regenerative braking; learning and remembering a difference between the regenerative braking control amount in a normal state calculated just before the failure and the braking amount for the failure check in the HCU and the EBS; compensating the braking amount for the failure check with the difference value between the normal regenerative braking control amount and the braking amount for the failure check; and performing a regenerative braking control in the HCU and the EBS respectively.

As a further exemplary embodiment, the braking amount for the failure check calculated by the EBS is [brake stroke depth+brake stroke depth×brake pushing time (sec)÷10 sec× 100]. As another exemplary embodiment, the braking amount for the failure check calculated by the HCU is a brake switch on time.

BRIEF DESCRIPTION OF THE DRAWINGS

The above and other features of the present invention will be described with reference to certain exemplary embodiments thereof illustrated the attached drawings in which.

DETAILED DESCRIPTION OF THE INVENTION

Figure 1:
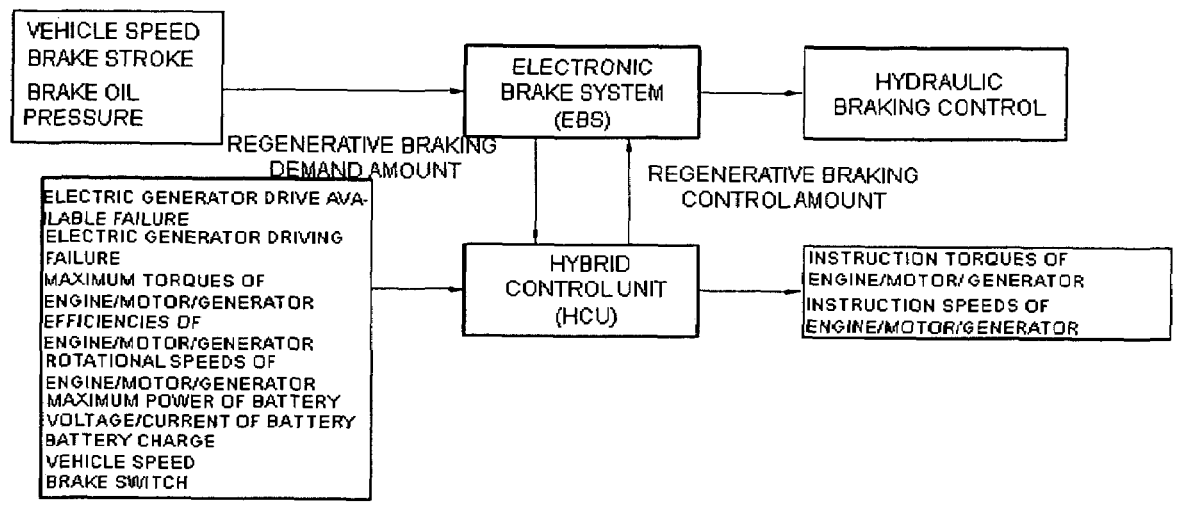
FIG. 1 is a block diagram depicting a regenerative braking for a hybrid vehicle in accordance with an exemplary embodiment of the present invention.
Figure 2:
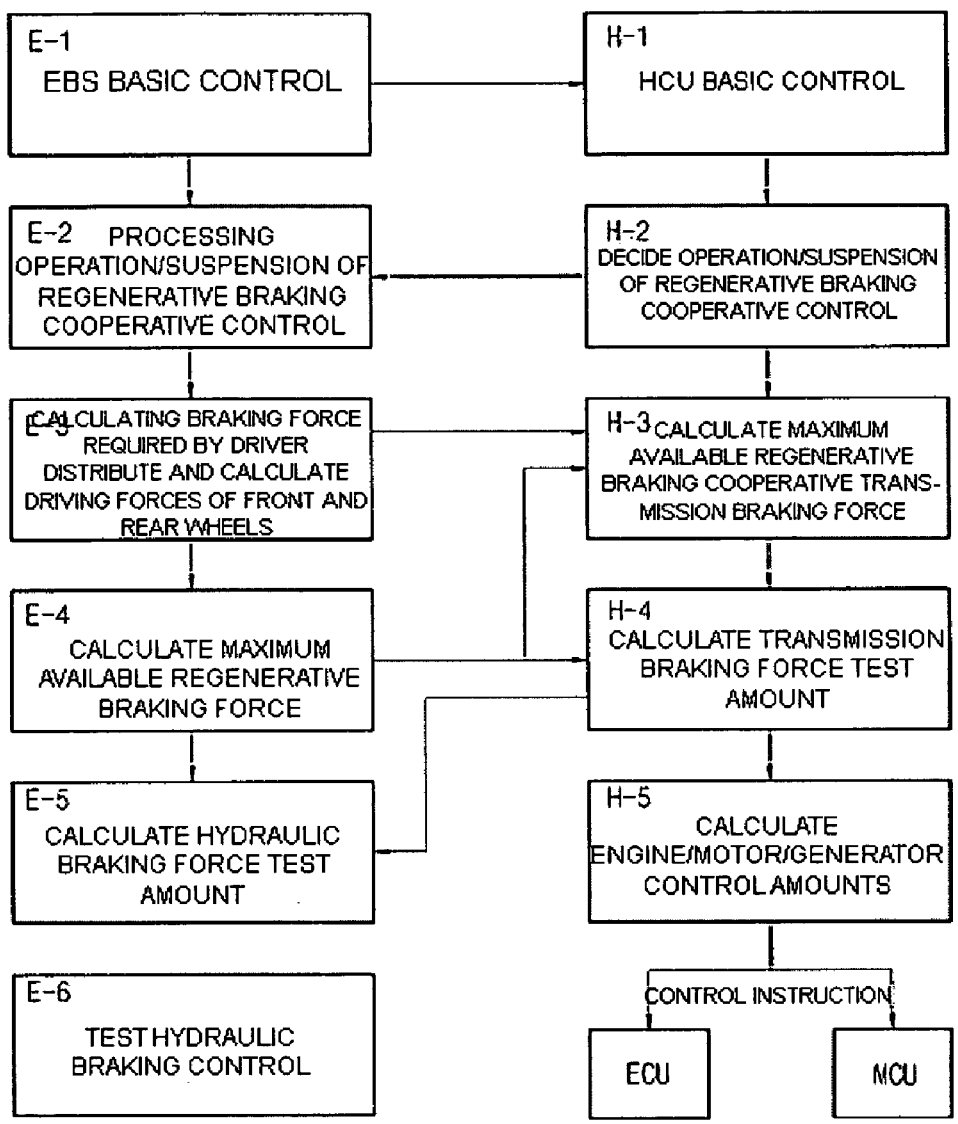
FIG. 2 is a block diagram depicting a control flow between an electronic brake system (EBS) and a hybrid control unit (HCU) in accordance with the present invention.

Hereinafter, exemplary embodiments of the present invention will now be described in detail with reference to the attached drawings.

The present invention aims at deciding a regenerative braking amount between an electronic brake system (hereinafter referred to as the EBS) and a hybrid control unit (hereinafter referred to as the HCU) when there occurs a failure during the regenerative braking. The EBS and HCU are well understood components of vehicles, including processors, memory and associated hardware and software as may be selected and programmed by persons of ordinary skill in the art based on the teachings of the present invention as set forth herein.

In one exemplary embodiment, the regenerative braking control should be suspended when there occurs a communication failure between the HCU and the EBS or when there occurs a failure in that the regenerative braking control is not available.

First, a method according to an exemplary embodiment of the present invention determines whether or not the regenerative braking is activated (S101).

1. If the regenerative braking is not activated: after determining whether there occurs a failure related to the regenerative braking (S102), the regenerative braking is prohibited and it does not enter the regenerative braking mode if there is a failure. However, it is possible to enter the regenerative braking mode, if determined that it is operated normally from IGN OFF to IGN ON.

2. If the regenerative braking is activated: this is directed to a case where the regenerative braking is prohibited when there occurs a failure.

1) The regenerative braking amount finally confirmed in a normal state by the EBS and the HCU is remembered (S103), and the failure related to the regenerative braking is determined (S104). Then, in case of a failure, the regenerative braking amounts are calculated by the EBS and the HCU, respectively (S105).

2) The regenerative braking is not activated when a vehicle is stopped.

The EBS receives a vehicle speed, a brake stroke and a brake oil pressure to control the hydraulic braking.

The HCU receives whether the electric generator can be driven or not, whether there occurs a failure or not, maximum torques of engine/motor/generator, efficiencies of engine/motor/generator, rotational speeds of engine/motor/generator, a maximum power of the battery, a voltage and current of the battery, a charging state of the battery, a vehicle speed, a brake switch, etc. to control the torques and speeds of engine/motor/generator. Moreover, the EBS instructs the HCU of a regenerative braking demand amount and the HCU instructs the EBS of a regenerative braking control amount through the CAN communication.

The method for calculating the hydraulic braking control amount in the EBS when there occurs a failure related to the regenerative braking will be described as follows.

The failure related to the regenerative braking includes an HCU CAN failure, an EBS CAN failure, an ABS failure, etc. and those failures are detected by the EBS. Here, the EBS detects a failure if it does not receive a signal of a regenerative braking control amount through the CAN communication for a predetermined time period.

The method for calculating the respective regenerative braking control amounts in the EBS and the HCU when there occurs a failure related to the regenerative braking will be described as follows.

1) Method for Calculating a Regenerative Braking Amount in the EBS

Figure 3:
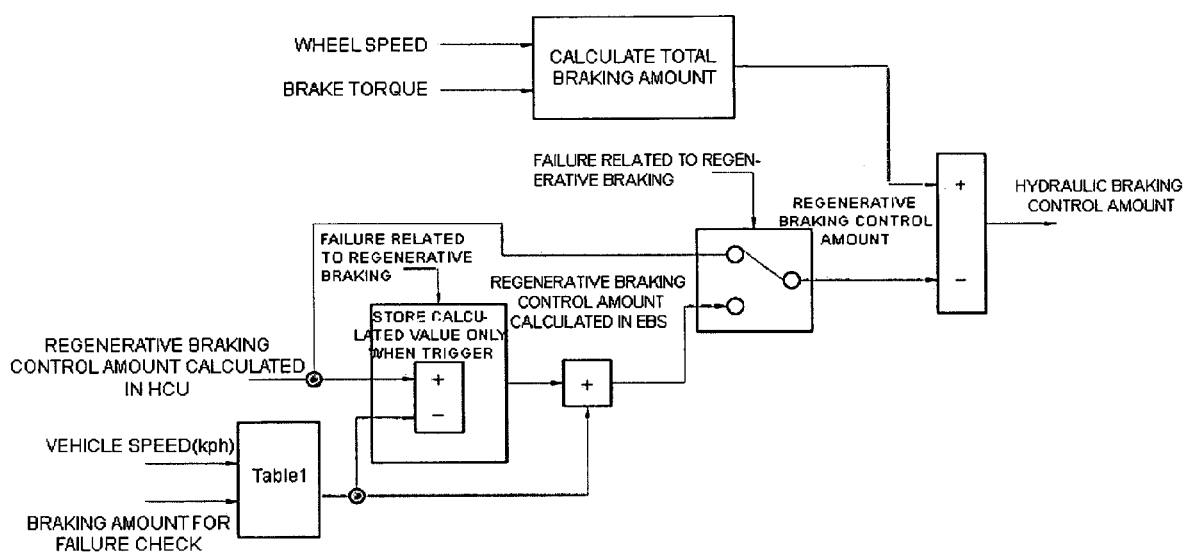
FIG. 3 is a block diagram illustrating a method for calculating a hydraulic braking control amount when there is a failure related to a regenerative braking of EBS in accordance with the present invention.

As depicted in FIG. 3, if a braking amount is 0, the regenerative braking amount is 0 regardless of the vehicle speed in table 1. As the braking amount becomes larger than 0, the regenerative braking control amount is increased up to 50% of the braking amount and then decreased, and the regenerative braking control amount is increased as much as the vehicle speed is high.

The EBS receives a wheel speed and a stroke value of the brake to calculate the total braking amount at all times. The hydraulic braking control amount is a value subtracting a regenerative braking control amount from the total braking amount. Here, the regenerative braking control amount is a value calculated in the HCU.

As described above, the hydraulic braking control amount in a normal state is controlled as a value subtracting the regenerative braking control amount of the HCU as it is from the total braking amount of the EBS.

When there occurs a failure related the regenerative braking, the regenerative braking control amount is not a value calculated in the HCU but calculated in the EBS.

The regenerative braking control amount calculated in the EBS is calculated by a regenerative braking failure converting unit, and the regenerative braking failure converting unit is denoted by a difference between the generative braking control amount (+) calculated in the HCU and a table 1 value (−).

A braking amount for failure check of the above table 1 is changed according to the vehicle speed. The braking amount for the failure check is a sum of a percentage value calculating a depth of the brake stroke in the EBS and a percentage value expressing how long a brake pedal is pushed down in the brake stroke depth more than 3%.

That is, the initial brake stroke depth is a momentary variation, and a value added to the initial brake stroke depth is calculated as [brake stroke depth×brake duration time (sec)÷10 sec×100].

Accordingly, the braking amount for the failure check is calculated as [brake stroke depth+duration time (sec) of brake stroke depth÷10 sec×100].

For example, supposed that the regenerative braking control amount calculated in the HCU is 24 and the braking amount for the failure check in table 1 is 17 when there occurs a failure related to the regenerative braking, the regenerative braking failure converting unit at a regular vehicle speed is 7.

The regenerative braking control amount calculated in the EBS is 7 and the hydraulic braking control amount in the regenerative braking failure is a value subtracting the regenerative braking control amount calculated in the EBS from the total braking amount calculated in the EBS.

2) Method for Calculating a Regenerative Braking Amount in the HCU

Figure 4:
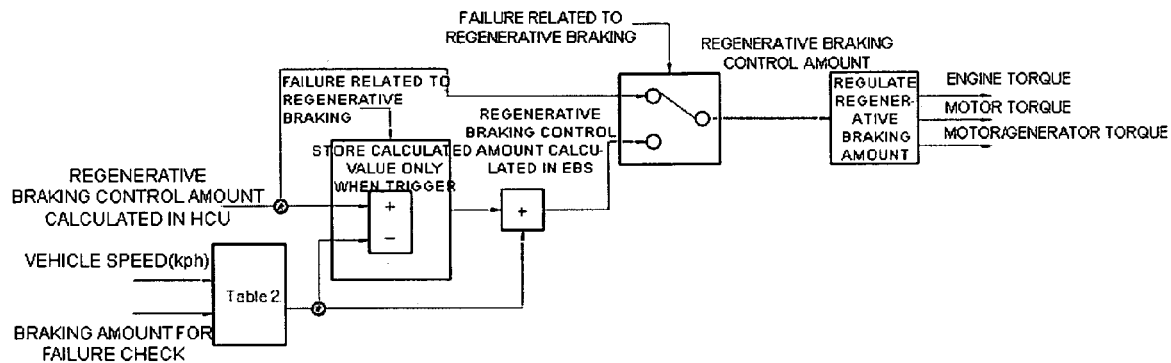
FIG. 4 is a block diagram illustrating a method for calculating a regenerative braking amount when there is a failure related to a regenerative braking of HCU in accordance with the present invention.
Figure 5:
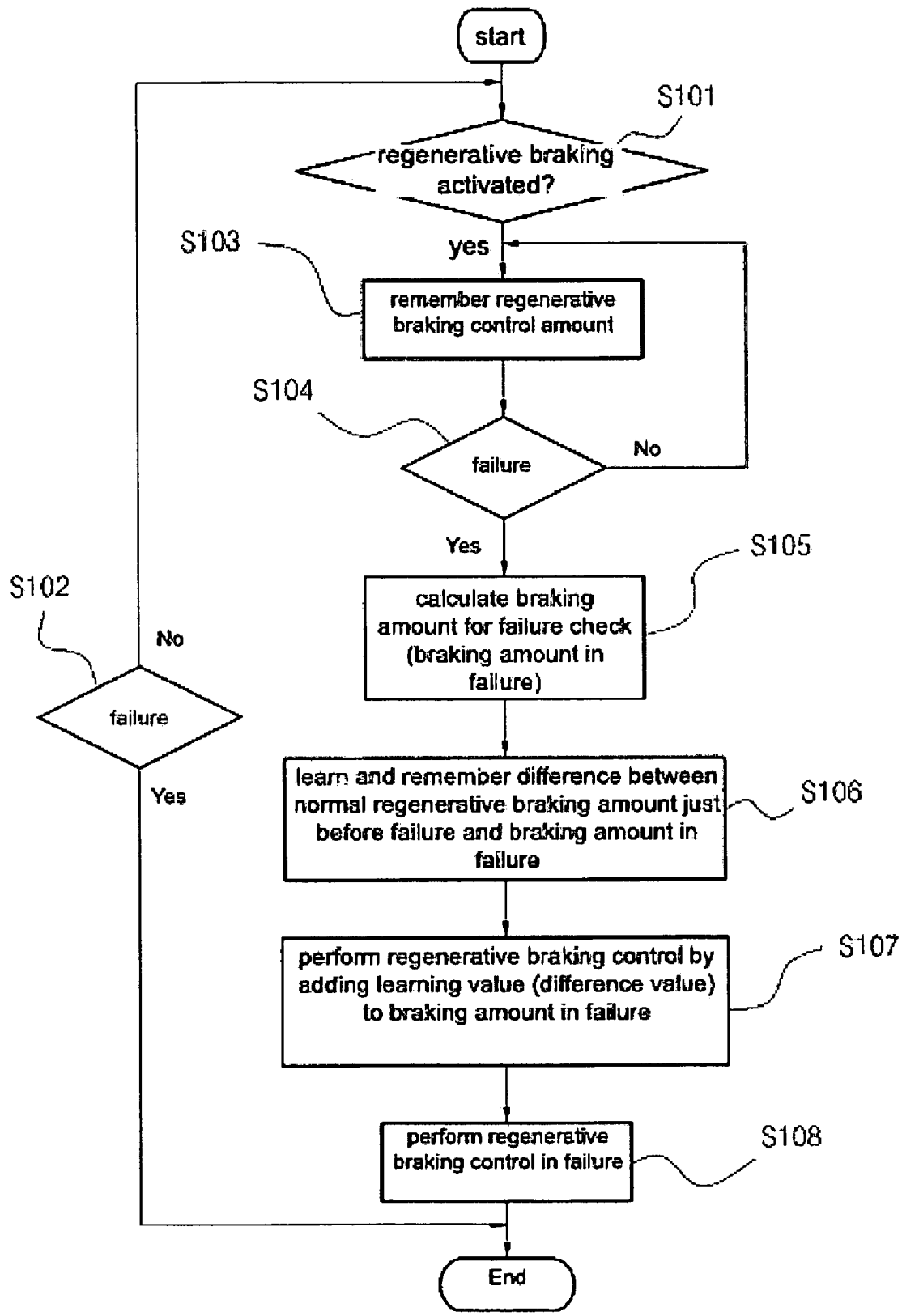
FIG. 5 is a flowchart depicting a method for compensating a regenerative braking amount in accordance with the present invention.

As depicted in FIG. 4, data in table 2 are similar to those in table 1 and there is only a difference in a method for calculating the braking amount. If a braking amount is 0, the regenerative braking amount is 0 regardless of the vehicle speed in table 2, and as the braking amount becomes larger than 0 the regenerative braking control amount is increased up to 50% of the braking amount and then decreased. Here, the regenerative braking control amount is increased as much as the vehicle speed is high. At this point, the braking amount for the failure check is directed to a brake switch on time.

The method for compensating the regenerative braking control amount when the regenerative braking of the vehicle fails in accordance with the above-described configuration of the present invention will be described as follows.

1) Determining whether or not the regenerative braking is activated (S101).

2) Remembering the regenerative braking amount in a normal state, where the regenerative braking is activated, in HCU and EBS (S103). Here, the regenerative braking amount in a state where the regenerative braking is not activated is 0.

3) Determining where there occurs a failure related to the regenerative braking (S104).

4) Calculating a braking amount for failure check is calculated with the brake switch on time in case of EBS or by the formula [brake stroke depth+brake stroke depth×braking pushing time (sec)÷10 sec×100] in case of HCU (S105).

5) Learning and remembering the difference between the regenerative braking control amount in a normal state calculated just before the failure and the braking amount for the failure check (S106).

6) Performing a regenerative braking control by adding a difference value between the regenerative braking control amount and the braking amount for the failure check obtained in the previous step to the braking amount for the failure check (S107).

In the above-described order, the EBS and the HCU performs the regenerative braking control respectively in the regenerative braking failure (S108).

As described above, according to the method for compensating the regenerative braking amount when the regenerative braking of the vehicle fails due to an error in the CAN communications between the EBS and the HCU, the EBS and the HCU control the regenerative braking amount respectively. Moreover, when there occurs a failure related to the regenerative braking, the method of the present invention compensates the braking force with the difference between the regenerative braking control amount in a normal state calculated just before the failure and the braking amount in the failure to increase or decrease the regenerative braking amount in accordance with the vehicle state, thus ensuring the battery charging strategy and improving the fuel efficiency.

As above, exemplary embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. A method for compensating a regenerative braking amount when regenerative braking of a vehicle fails, comprising:

determining whether or not the regenerative braking is activated;

remembering a regenerative braking control amount in a hybrid control unit and an electronic brake system, if determined that the regenerative braking is activated in the previous step;

calculating a braking amount for failure check in the hybrid control unit and the electronic brake system when there occurs a failure related to the regenerative braking;

learning and remembering a difference between the regenerative braking control amount in a normal state calculated just before the failure and the braking amount for the failure check in the hybrid control unit and the electronic brake system;

compensating the braking amount for the failure check with the difference value between the normal regenerative braking control amount and the braking amount for the failure check; and performing a regenerative braking control in the hybrid control unit and the electronic brake system respectively.

2. The method for compensating a regenerative braking amount when regenerative braking of a vehicle fails as recited in claim 1, wherein the braking amount for the failure check calculated by the electronic brake system is calculated as [brake stroke depth+brake stroke depth×brake pushing time (sec)÷10 sec×100].

3. The method for compensating a regenerative braking amount when regenerative braking of a vehicle fails as recited in claim 1 or 2, wherein the braking amount for the failure check calculated by the hybrid control unit is a brake switch on time.

* * * * *